Jan. 3, 1950 F. G. ESKUCHEN 2,493,622

AUTOMATIC SELECTOR MECHANISM

Filed Oct. 28, 1944 5 Sheets-Sheet 1

INVENTOR
FRANK G. ESKUCHEN
by H. G. Grover
ATTORNEY

Jan. 3, 1950 F. G. ESKUCHEN 2,493,622

AUTOMATIC SELECTOR MECHANISM

Filed Oct. 28, 1944 5 Sheets-Sheet 2

INVENTOR
FRANK G. ESKUCHEN
by [signature]
ATTORNEY.

Jan. 3, 1950    F. G. ESKUCHEN    2,493,622

AUTOMATIC SELECTOR MECHANISM

Filed Oct. 28, 1944    5 Sheets-Sheet 3

INVENTOR
FRANK G. ESKUCHEN
by [signature]
ATTORNEY

AUTOMATIC SELECTOR MECHANISM

Filed Oct. 28, 1944 5 Sheets-Sheet 4

INVENTOR
FRANK G. ESKUCHEN
by H. G. Gross
ATTORNEY

Jan. 3, 1950 F. G. ESKUCHEN 2,493,622

AUTOMATIC SELECTOR MECHANISM

Filed Oct. 28, 1944 5 Sheets-Sheet 5

INVENTOR
FRANK G. ESKUCHEN
by H. S. Grover
ATTORNEY.

Patented Jan. 3, 1950 2,493,622

UNITED STATES PATENT OFFICE 2,493,622

AUTOMATIC SELECTOR MECHANISM

Frank G. Eskuchen, Atlantic City, N. J., assignor to Radio Corporation of America, a corporation of Delaware Application October 28, 1944, Serial No. 560,818

5 Claims. (Cl. 74—10.2)

My invention relates in general to an automatic selector mechanism, and more particularly to such mechanism which is adapted to effect the adjustment of variable elements of radio apparatus to predetermined or prearranged positions.

It is desirable in certain radio installations, as in two-way communication systems for aircraft, to effect adjustment of both the receiver and the transmitter, expeditiously and accurately, from one predetermined channel frequency to another, sometimes in accordance with a definite time schedule. Each adjustment of such equipment ordinarily involves the angular positioning of a plurality of rotary tuning condensers or other variable tuning elements, and if the equipment is operative in a plurality of bands, then also the actuation of a band selector switch, and in some instances, a crystal selector switch.

Various automatic mechanisms have been devised, and some have been used with some success, for effecting the automatic adjustment of one or more variable elements, each to a plurality of predetermined positions. Devices well known in the art require an individual control unit in association with each of the variable elements to be adjusted. Assuming, for example, that the equipment to be controlled is provided with a plurality of independently adjustable elements, such as a pair of tuning condensers, a band selector switch and a crystal selector, there is required in accordance with prior practice to provide each adjustable element with a separate control unit, although the several units which are similar may be actuated by a single motor.

The present invention is an improvement on the automatic selector mechanism disclosed in an application of S. W. McKellip, Serial No. 560,817, filed concurrently herewith and assigned to the same assignee as this application, wherein there is utilized a single control unit to effect the automatic adjustment of a pair of adjustable elements to thereby simplify the construction, reduce the cost of production and to reduce also the weight and size of the apparatus, factors which are important considerations in aircraft installations.

One of the objects of my invention is to provide a selector mechanism of the type mentioned in which each control unit is so constructed and arranged that it performs its double function in a more efficient manner.

A further object of my invention is to provide a selector mechanism of the type mentioned in which each of the two elements to be adjusted has associated with it a selector disc assembly arranged to be locked in one of a plurality of predetermined positions by a common pivoted locking lever, and in which one of the disc assemblies, during actuation to any locked position, serves to apply a force to the locking lever to move it into position for locking the other disc assembly in its adjusted position, said force being applied to the lever at an intermediate point thereof and in a direction substantially normal thereto and while the first disc assembly is rotated in the same direction that the lever is rocked about its pivotal point.

Another object of my invention is to provide, in a selector mechanism of the type mentioned, a friction clutch of novel construction which can readily be adjusted to provide the desired driving relation between the driving motor and each driven selector assembly before slippage occurs.

Other objects and advantages of the invention will become apparent from the following description when read in conjunction with the accompanying drawings in which.

Figure 1:
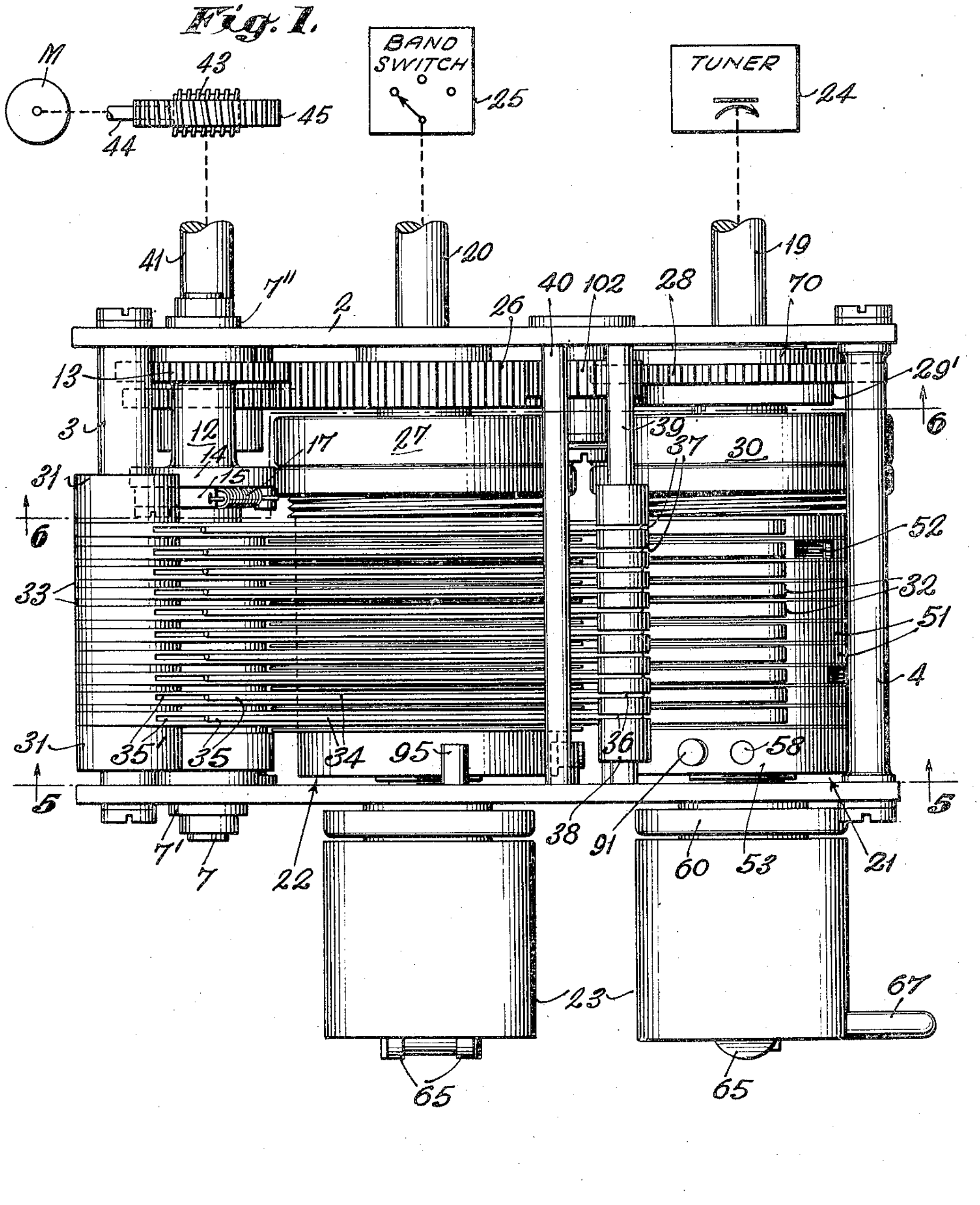
Fig. 1 is a plan view, on an enlarged scale, of the selector mechanism in accordance with the invention.
Figure 2:
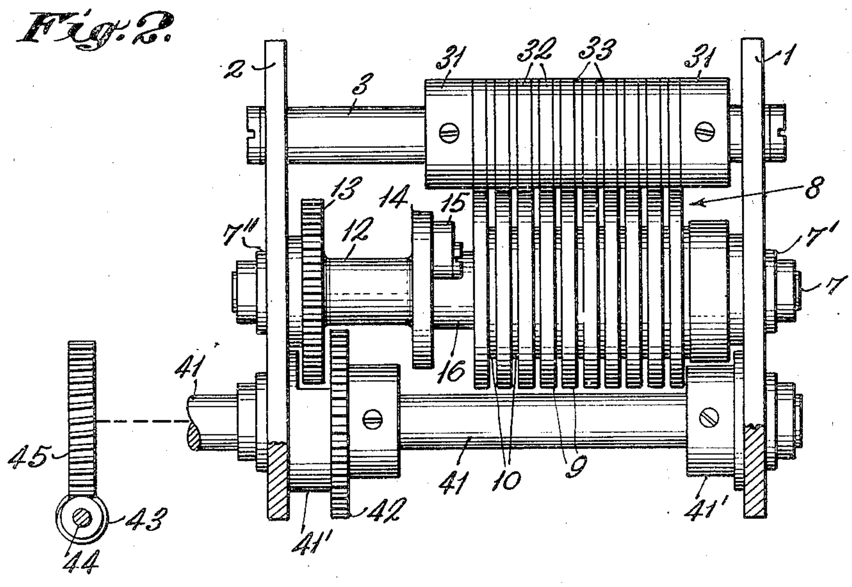
Fig. 2 is a partial side view of Fig. 1 looking from the left; with the lower part of the figure taken along the line 2—2 of Fig. 5 and certain parts such as the manual control knobs being omitted.

Referring to the drawings, and more particularly to Figs. 1 and 2, there is shown a single unit of the selector mechanism which consists of front and rear rectangular supporting plates 1 and 2, respectively, held in parallel spaced relation by four cross-rods 3 to 6, one in each corner. A cam shaft 7 extends between the plates at the left, Figs. 1 and 5, and is suitably journalled in bronze bearings 7',7'' therein. Shaft 7 carries at one end a cam disc assembly 8 which is fixed to the shaft and consists of a plurality of discs 9 (ten in the present instance) separated by spacers 10 (Fig. 2). Each cam disc has formed in its periphery a single notch 11 (Fig. 5), the several discs being so arranged in angular relation that the notches of the successive discs are equi-angularly spaced and arranged in a spiral formation. Since 10 cam discs are utilized in the present embodiment the notches are spaced at 36° intervals. Freely mounted on the other end of the cam shaft 7 is a bushing 12 provided at one end with a gear 13 and at the other end with a disc member 14 which pivotally supports a pawl 15 disposed in cooperative relation with a member 16 fixedly mounted on the cam shaft and movable with the cam assembly. By means of a coil spring 17 (Figs. 1 and 6) the pawl is urged to ride on the periphery of member 16 which has formed thereon a single tooth 18. The parts 15 and 16 operate as a pawl and ratchet to actuate the cam assembly in one direction of rotation of the gear 13 (clockwise) but not in the opposite direction.

Figure 3:
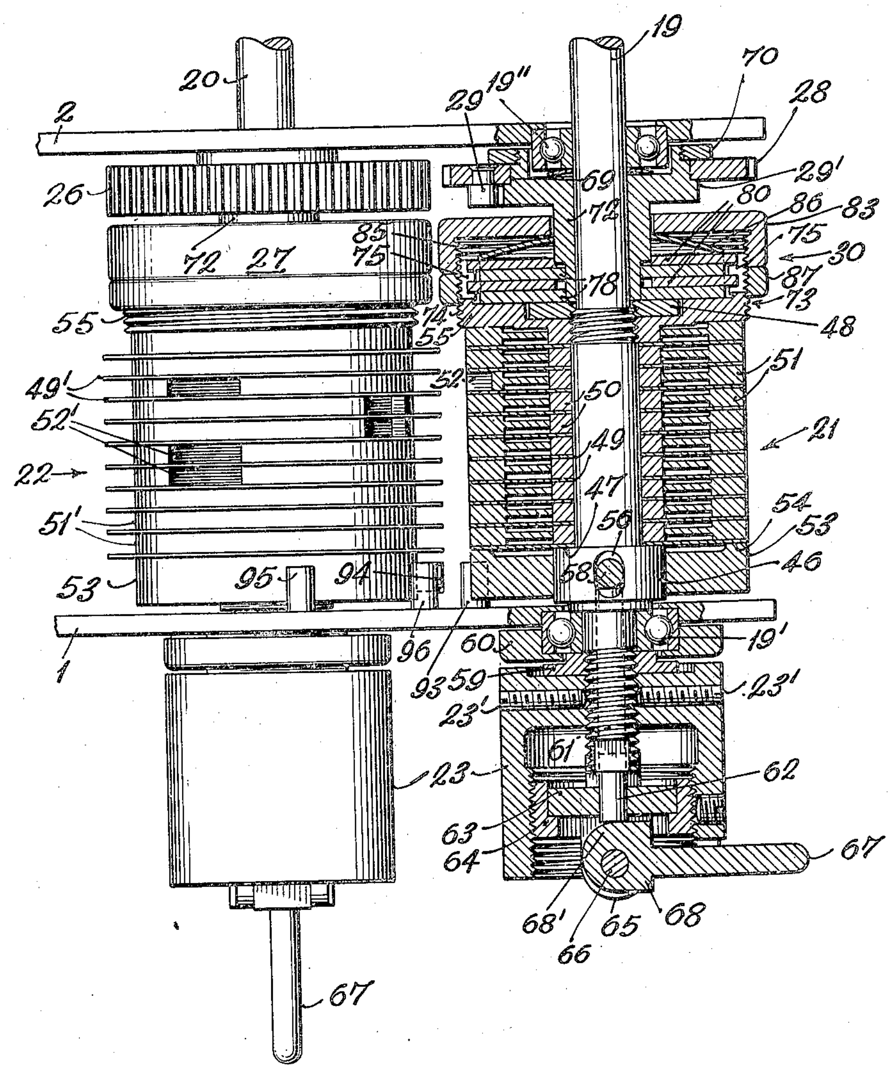
Fig. 3 is a view similar to Fig. 1, omitting certain of the elements and showing in cross-section the selector disc assembly which effects the accurate adjustment.

Also journalled within supporting plates 1, 2 and arranged in parallel relation with cam shaft 7 are a pair of shafts 19 and 20 on which there are mounted selector disc assemblies 21, 22, respectively, to be more fully described in connection with Fig. 3, it being sufficient for the present to state that each selector assembly, like the cam assembly, consists of 10 discs, with the discs of each assembly axially spaced along their respective shafts so that corresponding discs, one in each of the three assemblies, are aligned with one another. The forward end of each of the shafts 19 and 20 is provided with a manual control knob 23, and the rearwardly extending shaft ends are mechanically coupled each to a rotatable device to be adjusted. For example, shaft 19 may be coupled to a variable tuning condenser represented at 24 while shaft 20 may be coupled to a band switch represented at 25. A gear 26 is adapted to drive the disc assembly 22 through a slip clutch 27 and a gear 28 is adapted to drive the disc assembly 21 through a pin 29 and a disc 29' (Figs. 3 and 6) and a similar slip clutch 30.

Pivotally mounted on the cross-rod 3 which is located at the upper left-hand corner, and confined between a pair of collars 31 are ten stop-levers 32 separated by spacers 33. The several stop-levers are disposed above the disc assemblies, extending in a direction transverse to their shafts, and each lever is aligned with a set of corresponding, aligned discs, one in each assembly. For the purpose of having the several stop-levers spring-pressed towards the discs of the assemblies, there are provided individual springs 34 which have their free ends 35 seated in grooves 35' (Fig. 5) in the upper edges of the levers and their other ends 36 anchored in slots 37 formed in an elongated sleeve 38 which is keyed to a rod 39 supported between the front and rear plates. A second rod 40 also supported between said plates and spaced from rod 39 is arranged to contact the springs and to serve as a fulcrum therefor.

Located below the cam shaft 7 and journalled in bronze bearings 41' and 41' carried by the supporting plates 1 and 2 is a motor driven shaft 41 (Fig. 2) having affixed thereto a gear 42 which serves to drive the various elements of the selector unit. The shaft 41 is driven from an electric motor M through suitable reduction gearing, such as a worm 43 on the motor shaft 44 and a worm gear 45 on the shaft 41. Other selector units similar to that herein described may be driven from the motor shaft 44 through similar worm and gear sets.

Selector disc assembly 21 and the parts associated therewith are shown in cross-section in Fig. 3 to which reference will now be made. The shaft 19 is journalled in a ball-bearing 19' in the front plate and in a second ball-bearing 19'' in the rear plate. The forward end of the shaft, just behind the front plate, is provided with an enlarged portion 46 forming a shoulder 47 with the main portion of the shaft, and between said shoulder and a nut 48 which is screw-threaded on an intermediate portion of the shaft there are disposed alternate spacers 49 and ring bushings 50. The nut 48 when tightened serves to clamp the several ring bushings and the spacers against the shoulder 47 so that they rotate with the shaft as a unit. Encircling each of the bushings and disposed between adjacent spacers is a selector disc 51 provided at one point in its periphery with a notch 52, there being a total of ten such selector discs as mentioned above. For the purpose of clamping the several discs together for rotation with shaft 19 there is provided a pressure plate 53 slidably mounted on the shaft portion 46, so that by applying pressure to plate 53 in a rearward direction by means later to be described, the several discs are clamped together at the rims between a rearwardly extending rim portion 54 of the pressure plate and a second plate 55 formed integral with the ring bushing 50 next adjacent to the nut 48.

Figure 5:
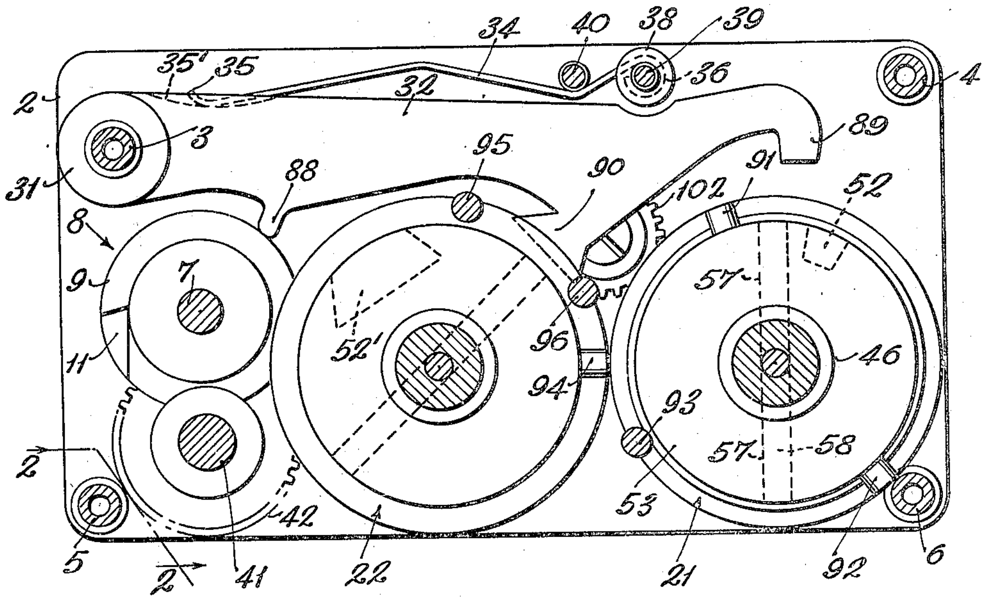
Fig. 5 is a cross-sectional view taken on the line 5—5 of Fig. 1.

In order that pressure may be removed from the selector discs to permit of individual angular adjustment thereof, and also for applying pressure to the discs to condition the assembly for normal operation, the shaft portion 46 is provided with a transverse radial slot 56 which passes therethrough from one side to the other, and the pressure plate 53 is provided with a pair of radially aligned bores 57 (Fig. 5). A rod 58 extends through the slot in 46 and its opposite ends are received in the bores of the pressure plate, a forced fit being provided between the rod and the bores. The pressure plate is thereby keyed to rotate with the shaft but by reason of the axial direction of the slot the pressure plate is capable also of axial movement on shaft portion 46.

The forward end of shaft 19 extends through the front plate and has a threaded portion for receiving a nut 59 which holds in position a retainer 60 for the ball-bearing 19'. The control knob 23 is fastened to the shaft by set screws 23', and this end of the shaft 19 is provided with a central bore 61 which extends into the slot 56 of shaft portion 46.

Within the bore 61 there is fitted a rod 62 for sliding movement. A member 63, which abuts against the end of shaft 19, provides a further bearing for the rod 62 and is clamped in position by a ring-nut 64 threaded within the front end of the knob. The member 63 is provided with a pair of ears 65 (only one being shown) between which there is supported a cross-pin 66 on which there is pivoted a lever 67. The pin is off-center with respect to the hub 68 of the lever to provide a cam surface at 68' for effecting the necessary sliding movement for the rod 62. In the position shown in Fig. 3 for the lever 67 associated with disc assembly 21, which is the operative position, the rod 62 has been pushed rearwardly to exert pressure on plate 53 through the rod 58, and in the position shown for the lever 67 associated with disc assembly 22, which is the adjusting position for the selector discs, the pressure heretofore exerted is removed by allowing the rod to move forwardly.

As heretofore mentioned selector disc assembly 21 and its shaft 19 are adapted to be rotated by the motor-driven gear 28 through pin 29 and disc 29', and also through the friction slip clutch 30. The pin 29 is carried on the side of the gear facing disc 29', the latter being provided with a hub 69 on which the gear is adapted to rotate, being retained thereon by means of a nut 70. Formed on a portion of the periphery of disc 29' is a radial extension 71 (Fig. 6) which extends into the path of pin 29 so that upon rotation of the gear 28 in either direction, after the lapse of a brief interval as determined by the relative positions of rest of the pin and disc extension, the pin will coact with one end 110 or the other 111 of the disc extension to rotate the disc in the corresponding direction.

Figure 4:
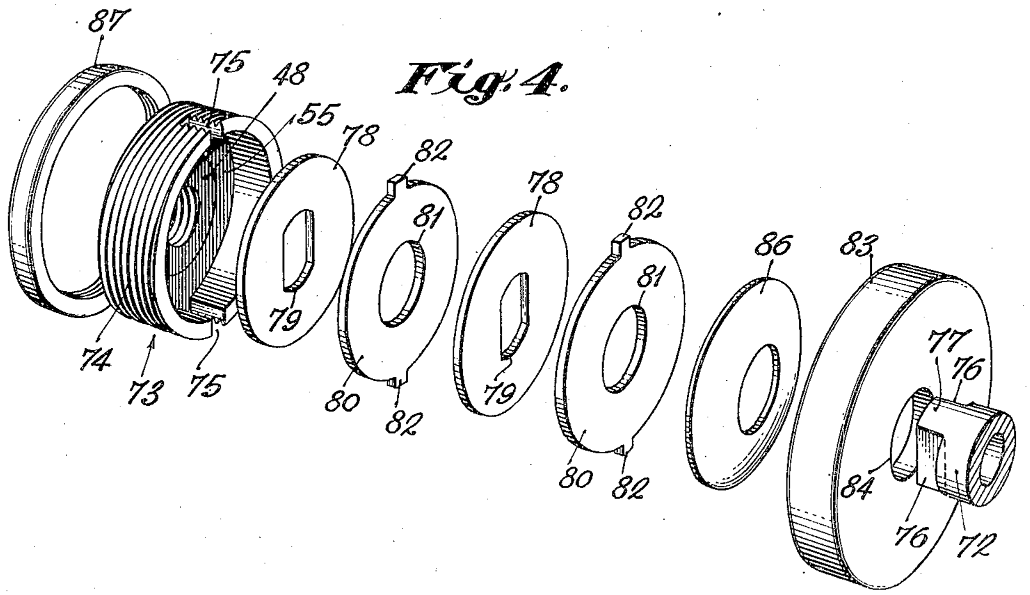
Fig. 4 is an exploded view, in perspective, of the clutch device.

Integral with disc 29' is a forwardly extending bushing 72 arranged to rotate on shaft 19 and with which friction clutch 30 is associated. The bushing extends into a cup 73 of which plate 55 constitutes the base. As shown more clearly in Fig. 4 the cup is provided with an externally threaded portion 74, and formed in the rim of the cup at diametrically opposite sides is a pair of slots 75. The part of the bushing that extends into the cup is cut away at diametrically opposite sides 76 to provide a portion 77 that is non-circular in cross-section. Within the cup, in contact with base plate 55, is a circular disc 78 which is provided with a central aperture 79 of a shape similar to non-circular portion 77 of the bushing and is therefore keyed to move therewith. In contact with plate 78 is a disc 80 provided with a central aperture 81 that is circular and is therefore adapted to rotate on the bushing. Disc 80, however, is provided at diametrically opposite sides with projections 82 which are adapted to fit into the slots 75 so that disc 80 and cup 73 move together. In contact with disc 80 is a second circular disc 78 and in contact with the latter is a second disc 80.

A cup 83 is provided with a central aperture 84 through which bushing 72 is adapted to extend and is internally threaded at 85 to engage the screw thread 74 of cup 73. A dished circular spring 86 is interposed between cup 83 and the second disc 80. By rotating cup 83 with respect to cup 73 in one direction or the other, the pressure applied through spring 86 to the stack of discs 78 and 80, and therefore the friction therebetween, may be varied to a greater or less extent. Also threaded on cup 73 is an internally threaded ring 87 which serves to lock cup 83 in its friction-adjusted position.

Discs 78 are of a metal known as "Oilite," a porous metal adapted to retain within its pores a quantity of oil, and discs 80 are of steel. Discs 78 are adapted to rotate within cup 73 and are keyed to move with bushing 72, while discs 80 are adapted to rotate on the bushing and are keyed to move with cup 73. As a consequence when bushing 72 is driven in either direction from gear 28 through pin 29 and extension 71, the disc assembly which is clamped to base plate 55 of cup 73 will be rotated through the discs of clutch 30 unless rotation of the assembly is restrained, at which time the "Oilite" discs 78 will slip with respect to the steel discs 80 if gear 28 is continued to be driven.

Except for the fact that discs 51' which constitute selector assembly 22 are provided with differently shaped peripheral notches 52', and for the fact that spacers 49' between discs 51' extend somewhat beyond their peripheries to provide guides for the stop levers 32, the disc assembly 22 is similar to disc assembly 21. Also, the slip clutch 27 associated with assembly 22 is of similar construction to clutch 30 described above, and the manual control knobs 23 for both selector disc assemblies are similar.

In the view of Fig. 5, which is a cross-section taken along line 5—5 of Fig. 1, there is shown the relative disposition of the selector disc assemblies 21 and 22, the cam drum assembly 8 and the stop levers 32. The three assemblies are arranged side by side and the stop levers are of sufficient length to extend over all three. Each stop lever is provided with a cam follower 88, a locking portion 89 at its free end, and a second locking portion 90 disposed at an intermediate point between parts 88 and 89. Cam follower 88 is adapted to ride on the periphery of its corresponding cam disc 9, being urged to that position by spring 34. Upon rotation of the cam assembly to a position such that the notch 11 of one of the cam discs arrives underneath follower 88, the lever 32 corresponding to said one cam disc will move about its pivot 3 in a clockwise direction. This movement of the stop lever will cause the locking part 90 to ride on the corresponding disc of assembly 22 until it drops into the disc notch 52', whereupon the lever will rock still further so that locking part 89 rides on the corresponding disc of assembly 21 until it drops into the disc notch 52. A complete cycle of operation for effecting adjustment of each selector disc assembly will be described later with reference to Fig. 7.

Although it has been mentioned that shaft 19 associated with disc assembly 21 is mechanically coupled to a variable tuning condenser which requires a fine or accurate adjustment and that shaft 20 associated with disc assembly 22 is mechanically coupled to a rotary band switch which requires only a coarse adjustment, they are of course not limited to the specific elements mentioned. For example, shaft 19 may be utilized to control any element that requires a fine adjustment, such as a variable inductor, and shaft 20 may be utilized to control any element that requires only a rough adjustment, such as any multi-position contact switch.

In the disclosed embodiment of the present invention the variable tuning condenser 24 under control of selector 21 is of the type that is adjustable through 180°. In order that this selector may be limited in its movement to this range, pressure plate 53 is provided on its periphery with a pair of suitably spaced radial pins 91 and 92 which are adapted to coact with a stop pin 93 (Figs. 5 and 7) which extends rearwardly from front plate 1 and in the path of pins 91 and 92. In the counterclockwise direction of rotation of assembly 21, from the position shown in Fig. 5, the variable condenser reaches its one limit of travel when pin 91 abuts stop pin 93 at the top, and in the clockwise direction of rotation the condenser reaches its other limit of travel when pin 92 abuts stop pin 93 at the bottom.

Band switch 25 in the disclosed embodiment is of the type that is rotatable through not more than 280° and is adjustable to three positions. In order that selector 22 may be limited in its movement to this range, its pressure plate is provided on its periphery with a radially extending pin 94 which is adapted to coact with a pair of stop pins 95 and 96 which extend rearwardly from front plate 1 and into the path of pin 94. Pins 95 and 96 are spaced 280° apart in the sense of rotation of selector disc assembly 22 so that in the counter-clockwise direction of rotation of assembly 22 the band switch reaches its one limit of travel when pin 94 strikes stop pin 96, and in the clockwise direction of rotation the switch reaches its other limit of travel when pin 94 strikes stop pin 95.

Figure 6:
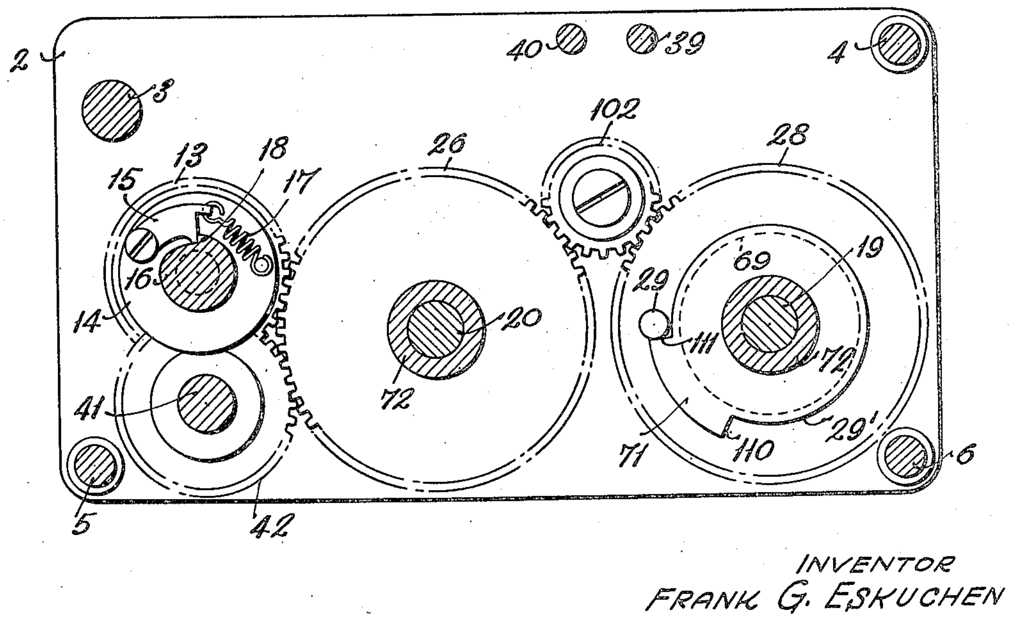
Fig. 6 is a cross-sectional view taken on the line 6—6 of Fig. 1 showing the parts in their relative positions approaching the end of operation in the forward direction.

In the view of Fig. 6, which is a cross-section taken along line 6—6 of Fig. 1, there is shown the gear drive for the several disc assemblies. Gear 42 on motor-driven shaft 41 is in mesh with gear 26 which is keyed to bushing 72 freely mounted on shaft 20. Gear 26 is in mesh with gear 13 which drives the cam assembly in only one direction through pawl 15 and ratchet 16. Gear 26 also drives gear 28 associated with assembly 21 through an idler 102 which is rotatably supported on the rear supporting plate 2. The drive between gear 28 and assembly 21 has already been described.

In order to effect operation of the several disc assemblies in the proper sequence, there is employed in conjunction with the mechanism herein described, a suitable electrical control system. The operation will hereinafter be described in connection with the electrical control system disclosed and claimed in an application of O. L. MacSorley, Ser. No. 560,816, filed concurrently herewith, now Patent No. 2,431,408, and assigned to the same assignee as the present application. The sequential operation of the several parts constituting a cycle, during which the two rotatable elements are to be adjusted, will be described briefly in connection with Fig. 7, which, except for reference numerals, is the same as Fig. 1 of the above-mentioned MacSorley application.

At 9, 51′ and 51 are shown, respectively, a cam disc, a selector disc for rough adjustment and a selector disc for fine adjustment. As explained above, these discs are aligned with each other and constitute a set of three corresponding discs, and they are aligned also with a stop lever 32 with which the latter is adapted to cooperate.

Figure 7:
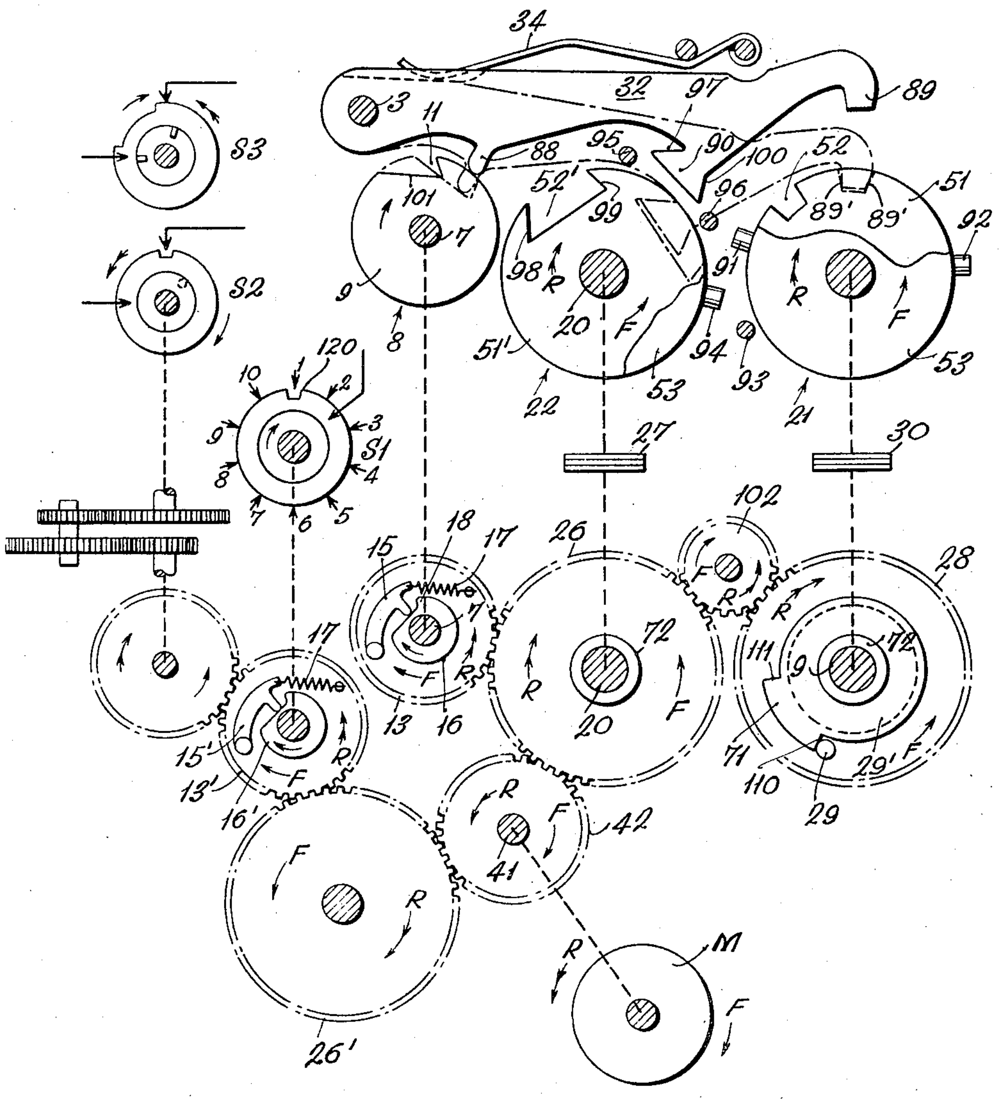
Fig. 7 is a diagrammatic showing of the mechanism for explaining the operation thereof.

Prior to the beginning of each cycle of operations of my invention, the disc assemblies 22 and 21 are locked by engagement of parts 90 and 89 on the particular lever 32, selected in the last previous cycle of operations, with notches 52′ and 52 of the corresponding selector discs 51′ and 51. In Fig. 7 the disc assemblies 22 and 21 may be considered as locked, in the positions shown, by a lever 32 other than that shown and whose follower 88 rests in a notch 11 of the corresponding cam disc 9. As shown in Fig. 7, a relatively small forward rotation of disc assembly 22 in the direction of the arrow F will bring the pin 94 against the stop pin 96, and also a relatively small forward rotation of disc assembly 21 will bring the pin 91 against the stop pin 93. This means that in the last portion of the previous cycle of operations, while being rotated in reverse direction (shown by double headed arrows R) away from the "homing" positions where pins 91, 94 engage stops 93, 96 respectively, both shaft 20 and shaft 19 and their respective disc assemblies were interlocked with the selected lever 32 before they had gone far. However, as will be further described, gears 26 and 28 are always rotated in the reverse direction far enough to enable disc assembly 22 to be locked in any selected position between limits determined by engagement of pin 94 with stop pins 96 and 95 respectively and to enable disc assembly 21 to be locked in any selected position limited by engagement of pin 91 with stop pin 93 and at the opposite end of its travel by engagement of pin 92 with the other side of stop pin 93. At the end of each cycle of operation the pawl 15 will usually occupy some position spaced from the tooth 18 of ratchet wheel 16, and pin 29 on gear 28 will engage the end 110 of extension 7 formed on disc 29′ which is integral with bushing 72 of friction clutch 30.

At the beginning of each cycle of operation, energization of motor 15 rotates gears 42, 26 and 28 in their forward directions, indicated by the arrows F. However, the cam disc assembly 8 will not be rotated until the pawl 15 has been engaged with the tooth 18 of ratchet wheel 16, and gear 28 will carry its pin 29 away from extension 71, and, in any event, selector disc assembly 21 cannot rotate because it is locked by part 89 of lever 32. Selector disc assembly 22 can at this time move only to the extent of the lost-motion of part 90 in the notch 52′, that is, from its radial position where edge 98 of notch 52′ abuts edge 97 of lever part 90 to its radial position where edge 99 abuts edge 100. However, when pawl 15 has engaged its ratchet tooth 18 to operate the cam disc assembly, the inclined edge 101 of notch 11 acting on follower 88 forces the lever 32 out of engagement with discs 51′ and 51, prior to which there may be slippage in the drive to one or both of shafts 20 and 19. After the lever 32 has been disengaged from the corresponding discs 51′ and 51, forward rotation of gears 42, 26 and 28 is continued over an interval assuring that selector disc assemblies 22 and 21 will be brought to their homing positions determined respectively by engagement of pin 94 with stop pin 96 and engagement of pin 91 with stop pin 93. During this interval, if engagement of a follower 88 in the notch 11 of its corresponding disc 9 by chance enables part 90 to engage partially with notch 52′ in a disc 51′, continued rotation of the cam disc assembly at once forces part 90 out of such engagement. After disc selector assemblies 22 and 21 have reached their homing positions, disc assembly 21 having been driven by engagemen of pin 29 with the end 111 of extension 71, the drives to the selector disc assemblies slip while the cam assembly 8 is turned an additional fraction of a revolution to bring it into such a position that cam follower 88 on the selected lever 32 is in registry with notch 11 in the corresponding cam disc 9. Rotation of the cam assembly 8 then ceases. At the instant that the cam assembly reaches this position, the driving motor M is caused to reverse its direction of operation. The shaft of the cam assembly does not turn when the motor is operated in the reverse direction, pawl 15 being, however, moved away from the ratchet tooth 18. Gear 26 is moved in a reverse direction to an extent such as to move selector disc assembly 22 through a cycle permitting any selected disc 51' to be engaged with part 90 of the corresponding lever 32. During this movement of gear 26, and consequently of gear 28, the pin 29 on gear 28 moves away from end 111 and toward the end 110 of extension 71 and after reverse rotation of cam disc assembly 22 has been wholly or substantially completed, gear 28 by engagement of pin 29 with the end 110 of extension 71 rotates selector disc assembly 21 in a reverse direction until it also is locked in by the selected lever 32.

The locking parts 90 and 89 engage their respective disc notches 52' and 52 in the following manner: Due to the positioning of notch 11 of cam disc 9 underneath cam follower 88, as described above, lever 32 will in the first instance rock about its pivotal point 3 to permit locking part 90 of the lever to drop into notch 52' of disc 51' a sufficient extent upon disc assembly 22 assuming the requisite angular position. This allows locking part 89 to ride on the periphery of disc 51. Continued rotation of disc 51' brings about a downward pull on the lever due to the application of a force on the upper edge 97 of locking part 90 by the disc part 98 which engages it and which provides a non-radial undercut actuating edge. Locking part 89 is therefore caused to ride on the periphery of disc 51 under pressure, and until the notch 52 comes into registry with part 89 friction clutch 27 associated with disc 51' will slip. Upon rotation of disc 51 to the point where part 89 drops into notch 52, a slight further rotation of disc 51' is permitted which results in the application of additional pressure between disc part 98 and lever part 97 to force home the locking part 89 in notch 52. Simultaneously disc 51' is forced home due to the coaction between parts 98 and 97 which in engaged position extend approximately parallel to the longitudinal axis of lever 32, as shown in Fig. 7.

It will be clear from the above that by reason of the construction and design of the stop lever, its locking part 90 and notch 52' of disc 51', the rotation of said disc in a clockwise direction to its adjusted position causes the simultaneous application of a force in a downward direction which is substantially normal to the stop lever also being moved in a clockwise direction so that locking part 89 when brought into registry with the notch of disc 51 is forced into it in a positive and efficient manner.

Since the selector disc assemblies will be stopped at different times the motor is permitted through the slip clutches 27 and 30 to continue operation until after the final disc assembly is stopped.

These operations are performed under the control of homing switch S1, limit switch S2, and further switch S3, Fig. 7, as more fully described in the above-mentioned MacSorley patent.

As heretofore mentioned the same motor may be utilized to control other selector units. In such cases clutches 27 and 30 of the unit above described will slip until all selector units are driven home, whereupon the motor will be caused to cease operation.

The locked position of lever part 89 in notch 52 is shown dotted in Fig. 7. These parts are so shaped that in the locked position contact therebetween is established at only the two points indicated by the arrows 89'. This enables accurate radial adjustment of the selector assembly 21 regardless of wear of either or both lever part 89 and notch 52, and regradless also of the wear of the lever 32 on its shaft 3.

The procedure for initially setting up each pair of corresponding discs of the two selector assemblies 21, 22 is as follows: The multi-position control switch S1 is first set to bring notch 120 to any desired position, such as, for example, position 1. This initiates operation of the mechanism, and upon completion of the cycle as above described cam disc 9 corresponding to said position 1 will have been rotated so that its notch 11 receives cam follower 88 of the corresponding stop lever, and the corresponding selector discs will have been rotated to their locked positions.

With the discs so locked, lever 67 associated with the manual control knob of each assembly is pulled out to thereby unclamp the disc stacks. Control knobs 23 are then manually rotated until the variable condenser and the band switch are set to their respective desired settings. The discs are then clamped together again by pushing in levers 67 to their first position. Thereafter for position 1 of the remote control switch both selector disc assemblies will be actuated to the positions just set. The same procedure is followed for the other positions of the remote control switch.

By reason of the fact that the discs of each assembly are mounted on the ring bushings 50 with sufficient friction and are unclamped at their peripheral rim portions which are separated by spacers or washers that are locked against rotation, the manual rotation in the setting up operation of all of the discs of the stack except the one that is held in locked position will not cause accidental displacement of any of the other discs that may have been adjusted previously.

While I have shown and described a preferred embodiment of my invention, it will be understood that various modifications and changes will occur to those skilled in the art without departing from the spirit and scope of this invention. I therefore contemplate by the appended claims to include any such modifications as fall within the true spirit and scope of my invention.

What I claim is:

1. A motor-operated selector mechanism adapted to effect the automatic adjustment of a device to a selected one of a plurality of predetermined positions, comprising a cam assembly selectively actuatable to settings which correspond each to one of said predetermined positions, a selector disc assembly mechanically coupled to the device, a plurality of stop levers, a selected one of which, depending upon the setting of the cam assembly, is adapted to stop the disc assembly at the selected predetermined position, said stop levers each being pivoted at one end and provided with a disc-stopping part at the other end and further provided with a depending portion intermediate said ends, spring-means coacting with said stop levers tending to move said levers individually in a particular direction about its pivoted end, means rotatable in the same direction as the stop levers for receiving the depending portion of any selectively actuated stop lever, said receiving means having a part which interlocks with the lever depending portion to rock the lever about its pivoted end and to force the opposite end to its stopping position, and drive means for actuating said receiving means, the cam assembly and the disc assembly in a predetermined sequence of operations.

2. In a motor-operated selector mechanism adapted to effect the automatic adjustment of a device to one of a plurality of predetermined positions and of the type provided with a cam assembly selectively actuatable to settings which correspond each to one of said predetermined positions, a selector disc assembly mechanically coupled to the device to be adjusted consisting of a plurality of discs each provided with a peripheral notch, the angular position of which determines the adjusted position of the device, a plurality of stop levers each provided with a stop portion, a selected stop lever depending upon the setting of the cam assembly adapted to have its stop portion engage the notch of the corresponding disc for stopping the selector assembly in one of said predetermined positions, and drive means for actuating the cam and selector assemblies in a predetermined sequence of operations, the improvement in such mechanism which consists in providing a second selector disc assembly mechanically coupled to a second device to be adjusted and consisting of a plurality of discs each provided with a peripheral notch, the angular position of which determines the adjusted position of the second device and a portion of which is undercut to define a non-radial edge, said stop levers being provided each with a second stop portion arranged to register with the peripheral notch of a disc of the second assembly, said second stop portion having an edge which extends in a plane substantially parallel to the longitudinal axis of the lever and which, upon registry of said stop portion and notch, coacts with the non-radial edge of the disk notch, whereby upon actuation of the second disc assembly a force is applied to the second stop portion in a direction substantially normal to the lever to thereby actuate the first stop portion to its home position with respect to the first selector disc assembly, and means for actuating the second disc assembly from the same drive means as, and in a definite timed relation with, the cam and first selector disc assemblies.

3. In a motor-operated selector mechanism adapted to effect the automatic adjustment of a device to one of a plurality of predetermined positions and of the type provided with a cam assembly selectively actuatable to settings which correspond each to one of said predetermined positions, a selector disc assembly mechanically coupled to the device to be adjusted consisting of a plurality of discs each provided with a peripheral notch, the angular position of which determines the adjusted position of the device, a plurality of stop levers pivoted at one end and provided each with a stop portion at its other end, a selected stop lever depending upon the setting of the cam assembly adapted to have its stop portion engage the notch of the corresponding disc for stopping the selector assembly in one of its predetermined positions, and drive means for actuating the cam and selector assemblies in a predetermined sequence of operations, the improvement in such mechanism which consists in providing a second selector disc assembly mechanically coupled to a second device to be adjusted and consisting of a plurality of discs each provided with a peripheral notch, the angular position of which determines the adjusted position of the second device and a portion of which is undercut to define a non-radial edge, said stop levers being provided each with a second stop portion disposed intermediate the pivoted end and the first stop portion and arranged to register with the peripheral notch of a disc of the second assembly, said second stop portion having an edge which extends in a plane substantially parallel to the longitudinal axis of the lever and which, upon registry of said stop portion and notch, coacts with the non-radial edge of the disc notch, whereby upon actuation of the second disc assembly a force is applied to the second stop portion in a direction substantially normal to the lever to thereby actuate the first stop portion to its home position with respect to the first selector assembly, and means for actuating the second disc assembly from the same drive means as, and in definite timed relation with the cam and first selector disc assemblies.

4. A motor-operated selector mechanism adapted to effect the automatic adjustment of a pair of devices each to one of a plurality of predetermined positions, comprising a cam assembly selectively actuatable to settings which correspond each to one of said predetermined positions, a first selector disc assembly mechanically coupled to one of the devices for effecting a fine adjustment thereof, a second selector disc assembly mechanically coupled to the other of said devices for effecting a rough adjustment thereof, the discs of each assembly being provided each with a peripheral notch, a plurality of stop levers each provided with a pair of locking parts which are adapted to register each with one of the disc notches, a selected stop lever depending upon the setting of the cam assembly adapted to stop said selector assemblies each at one of its predetermined positions, and drive means including a reversible motor for actuating the cam and selector assemblies in a predetermined sequence of operations, characterized in that the disc notch of the second selector assembly and the lever locking part registerable therewith have coacting edges which upon registry extend in a plane substantially parallel to the longitudinal axis of the lever and are so constructed and arranged that in one direction of rotation of said second assembly a force is exerted by the edge of the disc notch on its cooperating edge of the locking part in a direction substantially normal to the lever, causing thereby the other lever locking part to be driven home into the disc notch of the first disc assembly.

5. A motor-operated selector mechanism adapted to effect the automatic adjustment of a pair of devices each to one of a plurality of predetermined positions, comprising a cam assembly selectively actuatable to settings which correspond each to one of said predetermined positions, a first selector disc assembly mechanically coupled to one of the devices for effecting a fine adjustment thereof, a second selector disc assembly mechanically coupled to the other of said devices for effecting a rough adjustment thereof, the discs of each assembly being provided each with a peripheral notch, a plurality of pivoted stop levers each provided with a pair of locking parts which are adapted to register each with one of the disc notches, one for each disc assembly, spring means for urging the respective stop levers toward the selector assemblies, a selected stop lever depending upon the setting of the cam assembly adapted to stop said selector assemblies each at one of its predetermined positions, and drive means including a reversible motor for actuating the cam and selector assemblies in a predetermined sequence of operations, characterized in that the disc notch of the second selector assembly and the lever locking part registerable therewith have coacting edges which upon registry extend in a plane substantially parallel to the longitudinal axis of the lever and are so constructed and arranged that during rotation of said second assembly in the same direction in which the pivoted stop levers are urged a force is exerted by the edge of the disc notch on its cooperating edge of the locking part in a direction substantially normal to the lever, causing thereby the other lever locking part to be driven home into the disc notch of the first disc assembly.

FRANK G. ESKUCHEN.

REFERENCES CITED

The following references are of record in the file of this patent:

UNITED STATES PATENTS

| Number | Name | Date |
|---|---|---|
| 2,285,414 | Collins | June 9, 1942 |
| 2,334,724 | Paessler | Nov. 23, 1943 |
| 2,378,941 | May | June 26, 1945 |
| 2,391,470 | May | Dec. 25, 1945 |